(12) United States Patent
Shimura et al.

(10) Patent No.: US 10,777,795 B2
(45) Date of Patent: Sep. 15, 2020

(54) SEPARATOR INCLUDING RESIN MEMBER FORMED INSIDE POROUS SUBSTRATE, AND SECONDARY BATTERY EQUIPPED THEREWITH

(71) Applicant: NEC CORPORATION, Tokyo (JP)

(72) Inventors: Kenichi Shimura, Tokyo (JP); Noboru Yoshida, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 15/555,454

(22) PCT Filed: Mar. 4, 2016

(86) PCT No.: PCT/JP2016/056832
§ 371 (c)(1),
(2) Date: Sep. 1, 2017

(87) PCT Pub. No.: WO2016/140346
PCT Pub. Date: Sep. 9, 2016

(65) Prior Publication Data
US 2018/0040867 A1 Feb. 8, 2018

(30) Foreign Application Priority Data

Mar. 5, 2015 (JP) .................. 2015-044088

(51) Int. Cl.
*H01M 2/16* (2006.01)
*H01M 4/04* (2006.01)
(Continued)

(52) U.S. Cl.
CPC ............. *H01M 2/16* (2013.01); *H01M 2/162* (2013.01); *H01M 2/1653* (2013.01);
(Continued)

(58) Field of Classification Search
CPC ....... H01M 2/16; H01M 2/162; H01M 2/1653
(Continued)

(56) References Cited

U.S. PATENT DOCUMENTS

2002/0197413 A1* 12/2002 Daido .................. H01M 2/145
427/430.1
2012/0003524 A1* 1/2012 Jo ...................... B01D 67/0013
429/144

(Continued)

FOREIGN PATENT DOCUMENTS

JP  S 5177840 A   7/1976
JP  09-302115    11/1997
(Continued)

OTHER PUBLICATIONS

"Solvent." Merriam-Webster.com Dictionary, Merriam-Webster, https://www.merriam-webster.com/dictionary/solvent. Accessed Jan. 29, 2020. (Year: 2020).*
(Continued)

*Primary Examiner* — Sean P Cullen
(74) *Attorney, Agent, or Firm* — Finnegan, Henderson, Farabow, Garrett & Dunner, L.L.P.

(57) ABSTRACT

The separator for secondary battery, comprising: a porous substrate having a melting temperature or a decomposition temperature of 200° C. or more; and a resin member formed at least inside of the substrate in a plane section that occupies at least a part of a plane along with a thickness direction of the substrate; wherein said resin member is coated on inner surfaces of pores without completely blocking connecting paths that connects pores of the porous member, and wherein a distribution density of the resin member becomes lower toward inside of the substrate.

11 Claims, 2 Drawing Sheets

(51) Int. Cl.
*H01M 4/62* (2006.01)
*H01M 10/04* (2006.01)
*H01M 10/052* (2010.01)

(52) U.S. Cl.
CPC .......... *H01M 4/0404* (2013.01); *H01M 4/62* (2013.01); *H01M 10/0431* (2013.01); *H01M 10/052* (2013.01); *H01M 2/168* (2013.01)

(58) Field of Classification Search
USPC .......................................................... 429/144
See application file for complete search history.

(56) References Cited

U.S. PATENT DOCUMENTS

| | | | | |
|---|---|---|---|---|
| 2013/0089770 A1* | 4/2013 | Nishikawa | ............ | H01M 2/162 |
| | | | | 429/145 |
| 2013/0089771 A1* | 4/2013 | Nishikawa | ............ | H01M 2/162 |
| | | | | 429/145 |
| 2015/0028516 A1* | 1/2015 | Duong | ................. | B29C 48/022 |
| | | | | 264/173.19 |
| 2015/0188108 A1* | 7/2015 | Miyazawa | ......... | H01M 2/1653 |
| | | | | 429/145 |

FOREIGN PATENT DOCUMENTS

| | | | | |
|---|---|---|---|---|
| JP | 11-040130 | | 2/1999 | |
| JP | 11213981 A | * | 8/1999 | |
| JP | 11-250890 | | 9/1999 | |
| JP | 2000-044722 | | 2/2000 | |
| JP | 2005-183594 | | 7/2005 | |
| JP | 2005-302341 | | 10/2005 | |
| JP | 4350953 | | 10/2009 | |
| JP | 4465017 | | 5/2010 | |
| JP | 4588136 | | 11/2010 | |
| JP | 4792688 | | 10/2011 | |
| JP | 2013-211155 | | 10/2013 | |
| JP | 2014-167911 A | | 9/2014 | |
| WO | WO-2014017651 A1 | * | 1/2014 | .......... H01M 2/1653 |

OTHER PUBLICATIONS

"Resin." Merriam-Webster.com Dictionary, Merriam-Webster, https://www.merriam-webster.com/dictionary/resin. Accessed Jan. 29, 2020. (Year: 2020).*
International Search Report dated May 31, 2016, in corresponding PCT International Application.
Japanese Office Action dated Apr. 7, 2020, issued in co-pending Japanese Patent Application No. 2017-503730.

* cited by examiner

SEPARATOR INCLUDING RESIN MEMBER FORMED INSIDE POROUS SUBSTRATE, AND SECONDARY BATTERY EQUIPPED THEREWITH

TECHNICAL FIELD

The present invention relates to separator for secondary battery and secondary battery equipped therewith. The present invention relates particularly to separator for secondary battery with excellent heat-resisting property capable of preventing lithium metal from penetrating a separator when lithium deposits and secondary battery equipped therewith.

BACKGROUND ART

To improve safety of battery, heat-resisting non-woven fabric and wet porous membrane have been considered recently. Non-woven fabric has a high porosity and a long diameter since it is fiber assembly. However, it is relatively difficult to reduce the porosity of the wet porous membrane with maintaining connection between adjacent spaces, because the porous member is obtained by elution of fine particles mixed within a deposition layer or a membrane. In addition, low porosity would cause cost increase since a lot of expensive resin needs to be used. Furthermore, although high porosity is advantageous for charging and discharging at high rate, if once lithium deposits for example in quick charging at a low-temperature, an problem would happen that metal lithium become easier to penetrate inside. To solve this, laminating a porous layer such as polypropylene (PP) is possible, but there are problems such as increase of separator thickness and increase man-hours and cost for manufacturing a fine porous membrane.

With respect to a separator, patent document 1 discloses a separator with a low thermal contraction in overheating as following. The separator comprises a porous substrate made of material where its melting point is 180° C. or more, and a resin assembly formed at least one side or inside of the porous substrate, wherein the separator further included filler particles which has a melting point of 180° C. or more or substantially has no melting point.

PRIOR ART DOCUMENTS

Patent Document 1: Japanese Patent Laid-Open No. 2005-302341

SUMMARY OF INVENTION

Technical Problem

The separator as disclosed in the patent document 1 has the following problem. Specifically, forming a resin component on the porous member causes increase of the thickness of separator as a whole, and weight increase. Furthermore, resin component reduces porosity inside of the substrate. If filler particles are contained, the weight become heavier than a configuration, in which just the resin component is formed.

The objective of the present invention is thus to provide separator for secondary battery with excellent heat-resisting property capable of preventing lithium metal from penetrating the separator when lithium deposits, and secondary battery equipped therewith.

Means for Solving the Problems

1. A separator for secondary battery, comprising:
   a porous substrate having a melting temperature or a decomposition temperature of 200° C. or more; and
   a resin member formed at least inside of the substrate in a plane section that occupies at least a part of a plane along with a thickness direction of the substrate;
   wherein said resin member covers inner surfaces of pores without completely blocking connecting paths that connects pores of the porous member, and wherein a distribution density of the resin member becomes lower toward inside of the substrate.

According to the present invention, separator for secondary battery with excellent heat-resisting property capable of preventing lithium metal from penetrating the separator when lithium deposits and secondary battery equipped therewith can be provided.

DESCRIPTION OF EMBODIMENT

1. Basic Structure of Film-Packaged Battery

Figure 1:
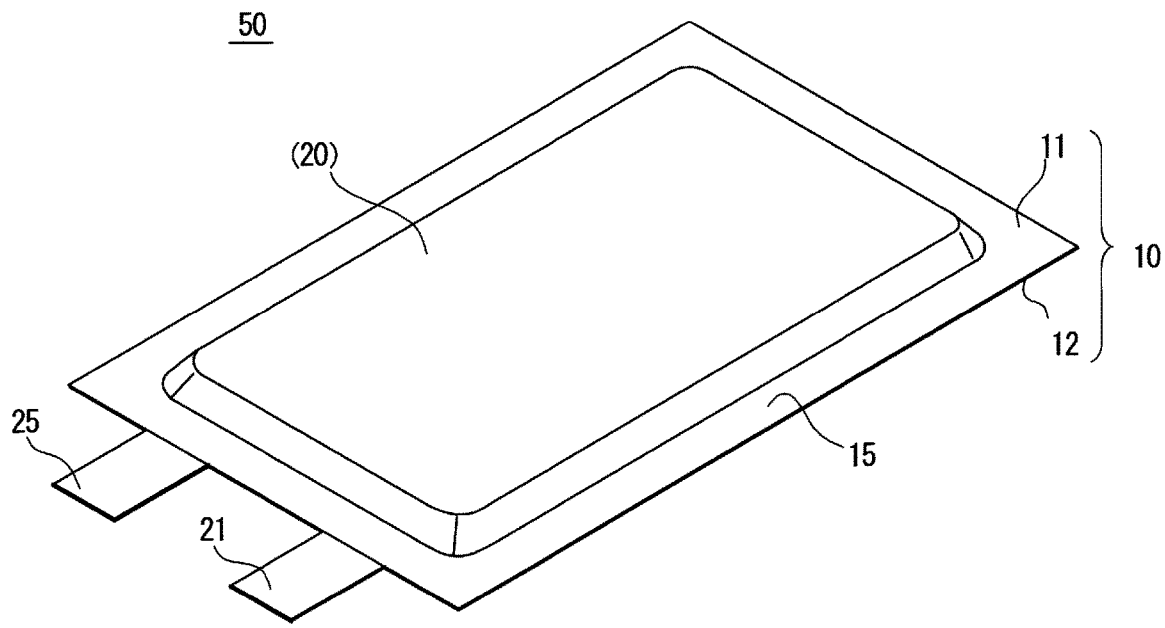
FIG. 1 is a perspective view of a basic configuration of a film-packaged battery according to an embodiment of the present invention.
Figure 2:
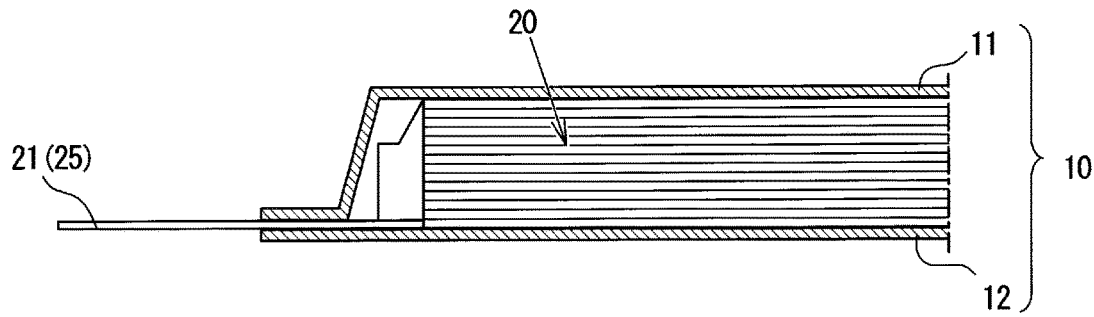
FIG. 2 is a sectional view of a part of the battery shown in FIG. 1.

Basic structure of a film-packaged battery 50 according to an embodiment of the present invention will be described below in reference to FIG. 1 and FIG. 2. As shown in FIG. 1 and FIG. 2, a film-packaged battery 50 comprises a battery element 20, an outer film package 10 for accommodating it together with non-aqueous electrolyte and a positive electrode tab 21 and a negative electrode tab 25 (also simply referred to as "electrode tab" below) which are connected to battery element 20 and extend outside of the outer film package 10.

The battery element 20 has s stacked structure in which a plurality of positive electrodes and a plurality of negative electrodes are stacked one by one with inserting separators, wherein each of the electrodes is made of metal foil both on which electrode materials have been coated (described later in reference to FIG. 3). In this example, outer shape of the battery element 20 is, but not limited to, an low-height rectangular parallelepiped shape in general.

Material of the outer film package 10 may be any material as long as it is stable against an electrolytic solution and has sufficient water vapor barrier property. For example, for the stacked-type secondary battery, a laminated film of aluminum and resin is preferable as the outer package. The outer package can be made of a single member or assembled members. In the present embodiment, as shown in FIG. 1, the outer film package 10 is composed of a first film 11 and a second film 12 facing thereto. As shown, a structure can be used in which a first film 11 has a cup portion and a second film 12 has no cup portion, or both films 11 and 12 have a cup portion respectively (not shown).

The shape of the outer film package 10 may be, but not limited to, a square, in this example specifically rectangle.

The films 11 and 12 are bonded together by heat sealing around the battery element 20. As a result, a heat sealed portion 15 is formed at a circumference of the outside the film package 10. The positive electrode tab 21 and negative electrode tab 25 are extruding from a short side of the heat sealed portion 15. Various materials can be used for electrode tabs 21 and 25, however, in one example, aluminum or aluminum alloy may be used for the positive electrode tab 21 and copper or nickel may be used for the negative electrode tab 25. If copper is used for the negative electrode tab 25, nickel plating on the surface can be used.

With respect to positions of the electrode tabs 21 and 25, tabs may be disposed at long side. Furthermore, positive electrode tab 21 and negative electrode tab 25 are disposed at different side. In one example, positive electrode tab 21 and negative electrode tab 25 can extends from opposite sides toward opposite directions.

Each of the positive electrode and negative electrode has an extending portion at a part of the outer area thereof that protrudes partially (refer to numerals 31a and 35a in FIG. 2), wherein the extending portion of positive electrode and the other extending portion of negative electrode are disposed alternatively so that they do not interfere with each other. The extending portions of positive electrodes are stacked and connected together to form a current collector portion 31a, and a positive electrode tab 21 is connected to the current collector portion 31a. Similarly, with respect to negative electrode, extending portions are stacked and connected together to form a current collector portion 31a, and a negative electrode tab 25 is connected to the current collector portion 31a. Welding can be used to connect the electrode tab to the current collector portion, for example.

It is noted that secondary battery type is, for example, cylindrical shape, flat wound square shape, stacked square shape, coin shape, flat wound laminated shape, stacked laminate shape or the like, on the basis of configuration or shape of its electrode. The present invention is applicable to any of these types. Among these, the stacked laminate shape is preferable in terms of the excellent heat-dissipation property when a battery element is heated.

Figure 3:
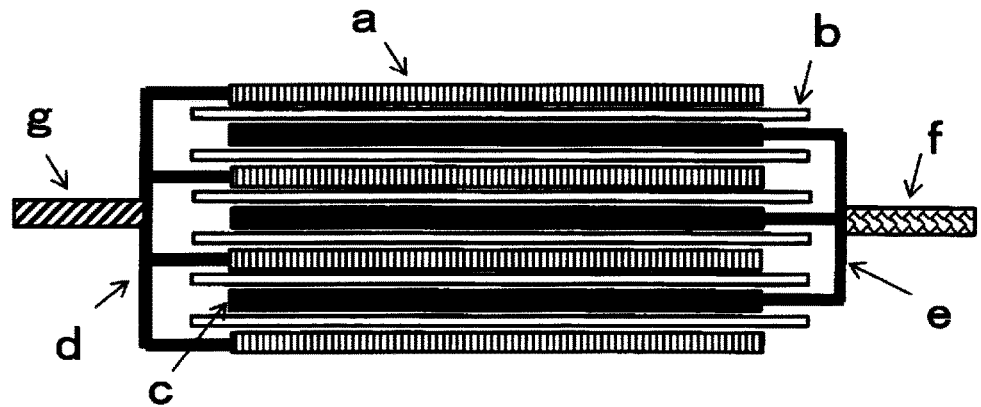
FIG. 3 is a sectional view of structure of a battery element, which a stacked-type secondary battery includes.

FIG. 3 shows a schematic sectional view of the battery element. It is noted that although the shape of battery element shown in FIG. 2 is different from that of FIG. 3, such a shape difference is not essential matter in the present application. As shown in FIG. 3, the battery element may have a stacked structure in which a plurality of negative electrodes and a plurality of positive electrodes c are stacked alternatively with inserting separator b therebetween. Electrolytic solution is filled into the outer package together with the negative electrode a, positive electrode c and separator b. The negative electrode a has an extending portion (or tab) g that protrudes from the separator b. The extending portions is an end portion which is not coated with a positive electrode active material of a negative current collector d of the negative electrode a. Similarly, in the positive electrode c, an extending portion (tab) f, an end portion which is not coated with a positive electrode active material of positive current collector e of the positive electrode c, is protruding from the separator b.

2. Specific Configuration of Each Element

For components of the battery, the followings may be used specifically.

<2-1. Separator>

Separator in the present embodiment has a substrate made of a porous membrane, woven fabric or non-woven fabric with a melting temperature of 200° C. or more or a decomposition temperature of 200° C. or more. It is preferable that a different resin from that of the substrate is composited on inside of the pores or the spaces that open to the surface of the substrate (specifically described below).

It is noted that "pore" refers to a fine pore formed inside of the porous member and "space" refers to an inner space of the woven fabric or non-woven fabric.

Figure 4A:
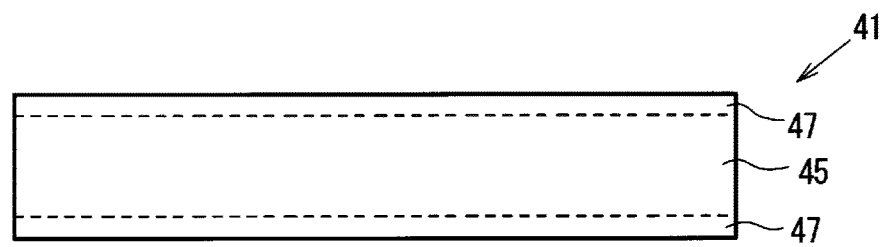
FIG. 4 is a sectional view, which schematically shows a separator according to an embodiment of the present invention.

As example of composite, a resin coating portion 47 may be formed on the inside of substrate 45 of the separator 41 (specifically near the surface of one side or both sides) as shown in FIG. 4A. In another embodiment, a resin layer 46 may be formed on the surface of the substrate in addition to the resin coating portion 47. The resin layer 46 and/or the resin coating portion 47 may be provided only on the one surface or on both sides of the substrate 45. Furthermore, a configuration may be used in which only a resin coating portion 47 is formed at the inside of one surface, whereas a resin coating portion 47 is formed at the inside of the other surface and resin layer 46 is formed on the same.

Figure 5:
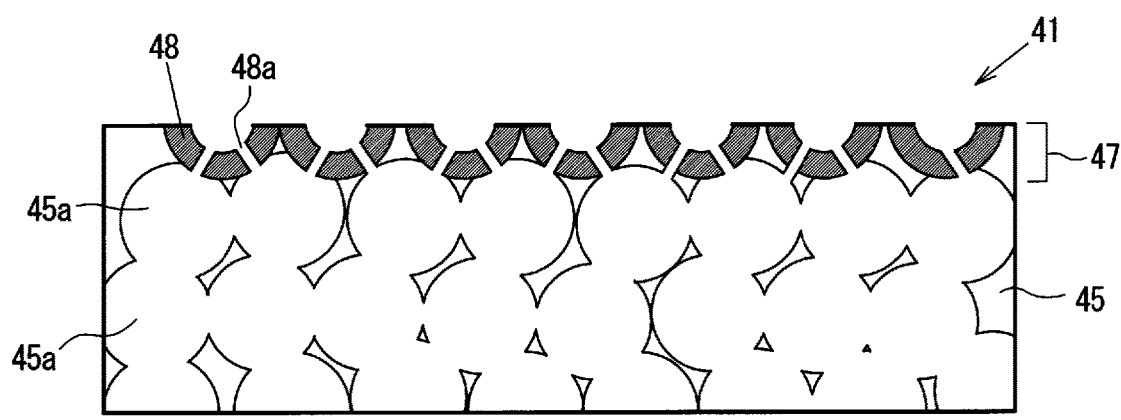
FIG. 5 is a sectional view, which schematically shows a separator according to another embodiment of the present invention.

FIG. 5 shows an enlarged schematic sectional view of the sectional structure of the separator. A plurality of pores 45a are formed in the substrate 45. As a substrate 45, high heat-resistance material may be used, wherein a thickness of the material may be 5 μm or more and 50 μm or less, and melting temperature or decomposition temperature may be 200° C. or more. Porous membrane or non-woven fabric or the like may be used. With respect to the substrate 45, it is preferable that a plurality of pores or spaces may exist along a thickness direction of the substrate, and, preferably no straight path penetrating from the one side to the other side of the substrate is provided.

In FIG. 5, resin 48 is coated, in a form of continuous membrane on the inner wall of the pores that open to the surface of the substrate except for paths 48a. However, a part of the inner wall may be exposed.

In FIG. 5, although the resin coating portion 47 is provided in the pores that open to a surface of substrate, resin may exist inside of the inner pores 45a that do not directly open to the surface of the substrate. It is noted that existing amount of the resin in the substrate 45 becomes lesser toward inside from the surface of the substrate 45.

Size of pore 45a (average inner diameter) is for example 1 μm or less, preferably 0.5 μm or less, more preferably 0.1 μm or less.

Diameter of the pore is calculated by measuring a sectional area of the pore in an image obtained by observation of a sectional view of the separator with a scanning electron microscope (SEM) and by deciding a diameter of a circle, which has the same area as the sectional area. Average diameter of the pore is calculated by measuring all pores in the observation image and omitting upper 5% and lower 5%. It is noted that pores, which opens to a surface of the separator is not, used in calculation for a diameter.

In this example, the resin coating portion 47 is formed as a form of resin 48 that is disposed on a region near the surface inside the substrate 45. Much resin 48 exist in pores or spaces that open to a surface of the substrate 45 and in an inside region near the surface. By contrast, less resin or no resin exists in the inside of the substrate 45.

Resin 48 covers inner face of the pores 45a near the surface. Not to impede the separator function, the resin 48 is coated in a manner in which pores and connecting paths that connects the pores are not completely blocked. This means that there are paths 48a connecting pores or spaces each other as schematically shown in FIG. 5. It is noted that shape of the paths 48a itself may be, but not limited to, an elongated hole or opening.

Amount of composite resin is 10 wt % or less of the entire separator. This is because too much resin might block pores or spaces and interfere movement of the lithium ions between the positive electrode and the negative electrode.

As described above, the resin layer 46 may be formed at the outside area of the surface of the substrate 45. In this case, thickness of the resin layer 46 is preferably 1 µm or less. With respect to the resin layer 46, although it is expressed by term "layer", it is also preferable that resin is formed on a surface of the substrate 45 in non-continuous state in plane.

For example, provided that A refers to an area (plane view) of the surface of the substrate except for openings, and B refers to an area (plane view) of resin on the surface except for the openings, a ratio (B/A) may be 90% or less, preferably 70% or less, more preferably 50% or less.

Additionally, with respect to the shape of the resin material of the resin layer 46, for example, on a region except for openings of substrate surface, existing resin material may encompass a plurality of regions isolated from circumference in a plane at the height of substrate surface.

FIG. 5 depicts a configuration in which the resin 48 does not protrude from the surface of substrate. However, the resin 48 may slightly protrude from the surface of substrate, and protruding amount (height from the surface of the substrate to the top of the resin 48) in this case may preferably be 5 µm or less, more preferably 3 µm or less, particularly preferably 1 µm or less.

Porosity of the entire separator is preferably in range of 55% to 80%. Separator with a higher porosity is advantageous since it can retain much electrolyte solution that enables long-term use, and it can reduce amount of resin to be used for the substrate. By contrast, too high porosity would reduce mechanical strength.

Gurley value of the entire separator is preferably 100 sec/100 ml or more and 300 sec/100 ml or less. Low Gurley value separator is advantageous for large current discharging. However, if lithium deposits on a negative electrode for example due to quick charging at low temperature, the deposit of lithium tends to well grow moving into the inside of the separator, that would cause a short between the positive electrode and the negative electrode. On the other hand, high Gurley value makes it more difficult to obtain large current discharging, since conductivity of lithium ion between the positive electrode and the negative electrode reduces.

In one embodiment, it is also preferable that a decreasing rate of Gurley value after removing the resin material from the entire separator by elution with solvent or thermal decomposition, to obtain a substrate itself, is 10% or more.

Figure 4B:
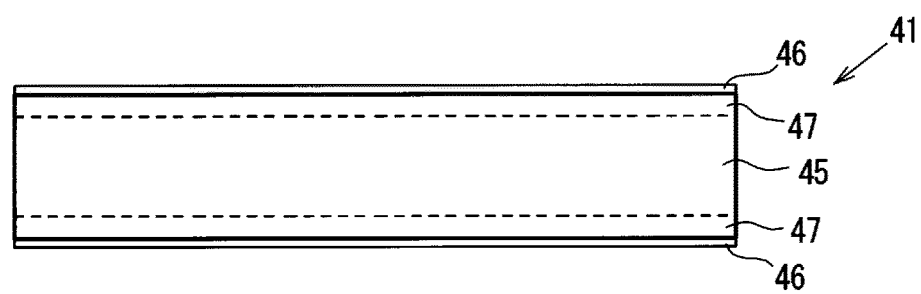

In FIG. 4A, FIG. 4B and FIG. 5, it is supposed that the resin coating portion 47 or the resin layer 46 is formed on the entire surface of the substrate in principle. However, the present invention is not limited to such a structure. Resin material may be formed on a plane region which occupies at least a part of a plane viewed from a thickness direction of the substrate (for example, a region of 30% or more in an area ratio relative to a surface of substrate, a region of 50% or more, or 70% or more).

Occurrence of the effect according to one embodiment of the present invention does not rely on a property of the high heat-resistance material itself used for the substrate. However, high heat-resistance material may be a resin material such as polyamide, particularly aromatic polyamide (aramid), polyimide, polyethylene terephthalate (PET), polyphenylene sulfide (PPS), cellulose, and the like.

Composite of resin to the substrate can be achieved by dissolving resin in solvent, feeding to the surface of the substrate and drying it. As resin material for composite with the substrate, a material can be used that is resistant to electrolyte solution and does not melt or sublime within temperature range for battery use. For example, polyvinyl alcohol (PVA), sodium carboxymethyl cellulose (Na-CMC), polyacrylic acid (PAA), styrene-butadiene rubber (SBR), polyvinylidene fluoride (PVDF) or the like may be used.

Either of aqueous solvent or organic solvents may be used for solvent as long as the liquid enables resin to be dissolved or enables fine resin particles to be dispersed without erosion of the substrate. For example, water-soluble resin or combination of water-dispersible resin and pure water can be used. Mixture of pure water and ethanol or surfactants can improve the affinity between the substrate material and the resin solvent. Compared with non-aqueous solvent, solvent mainly composed of water is advantageous in terms of low environmental impact, simplifying detoxifying facilities, and low solvent cost or the like.

Composite of resin can be performed from one side surface or both side surfaces of the substrate. When compositing from one side surface, applying or spraying a resin solution on one side of the substrate can be used. Alternatively, it is possible to pull out the substrate after putting it on a surface of the resin solution thereby to supply the resin solution to the one side of the substrate. When compositing from both surfaces of the substrate, applying or spraying a resin solution on both surfaces the substrate can be used. Similar to the above, it is possible to pull out the substrate after immersing it in the resin solution thereby to supply the resin solution to both surfaces of the substrate.

It is possible to obtain composite resin by removing solvent of the resin solution supplied with the surface of the substrate. After compositing of the resin, heat treatment or chemical treatment may be used for the composite resin if necessary. For example, with respect to PVA, it is possible to increase water resistance by formalization of reaction with formaldehyde by using acid as a catalyst, in addition to the heat treatment, When supplying the resin solution to the surface of the substrate, since diameters of the pores of the substrate as well as connecting path that connects pores with each other are small, resin solution tends not to permeate into the substrate. Therefore, the composite resin mainly exists within the inside of pore that open to the substrate surface, or within pores just below the substrate surface, and amount of composite resin decreases as going into inside of the substrate.

Permeability of the resin solution into the resin substrate is changeable in accordance with solvent of resin solution. For example, permeability into the substrate is increased when adding ethanol to pure water as a solvent. Furthermore, since non-woven fabric does not have a structure of pore and connecting paths, the resin solution easily permeates into the inside. However, it is possible to suppress the penetration of the resin solution into the substrate inside, by increasing viscosity of the resin solution, increasing a surface tension, or lowering an affinity between the substrate and the resin solution.

<2-2. Negative Electrode>

A negative electrode has a negative electrode current collector made of a metal foil, and a negative electrode active material applied to both surfaces of the negative electrode current collector. Negative electrode active material is bound on the negative electrode current collector by a binder for the negative electrode so as to cover the negative electrode current collector. Negative electrode current collector is arranged to have an extending portion connected to a negative electrode terminal, and the negative electrode active material is not applied to the extending portion.

The negative electrode active material in the present embodiment may be for example, but not limited to, carbon material capable of storing or releasing lithium ions, metal capable of being alloy with lithium, metal oxide capable of storing or releasing lithium ions and the like.

Examples of carbon material may be graphite, amorphous carbon, diamond-like carbon, a carbon nanotube, or a composite thereof. Carbon with high crystallinity has a high electrical conduction property and excellent binding property with negative electrode current collector made of metal such as copper as well as excellent electrical flatness. On the other hand, amorphous carbon with low crystallinity indicates relatively low volume expansion, therefore it can effectively defuse the volume expansion of the entire negative electrode, and degradation due to uniformities such as grain boundary and deficiency.

Negative electrode containing metal or metal oxide is preferable since it can improve an energy density, and increase battery capacity per unit weight or per unit volume.

As the metal, Al, Si, Pb, Sn, In, Bi, Ag, Ba, Ca, Hg, Pd, Pt, Te, Zn, La, or an alloy containing two or more of these may be exemplified. Alternatively, it may be used by mixing two or more of these metals and alloys. These metals and alloys may comprise one or more non-metal elements.

Examples of the carbon material include graphite, amorphous carbon, diamond-like carbon, a carbon nanotube, or a composite thereof. It is preferable that tin oxide or silicon oxide as a negative electrode active material is included, particularly that silicon oxide is included. This is because silicon oxide is relatively stable and tends not to cause a reaction with other compound. Additionally, amorphous structure preferably is included partly or entirely. It is thought that amorphous structure has a little element derived from uniformities such as grain boundary and deficiency. It is noted that it is possible to confirm that entire of or part of the metal oxide contains amorphous structure with x-ray diffraction (general XRD measurement). Specifically, if metal oxide does not have an amorphous structure, peak will be detected inherent to the metal oxide, but if the entire of or part of the metal oxide has amorphous structure, peak inherent to the metal oxide will be detected in a broad manner.

It is noted that instead of using carbon material, metal or metal oxide alone, mixture thereof can be used. For example, same kind of materials such as graphite and amorphous carbon may be mixed or different kind of materials such as graphite and silicon may be mixed.

Examples of the negative electrode binder include, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like. The amount of the negative electrode binder is preferably 2 to 15 parts by mass based on 100 parts by mass of the negative electrode active material, from the viewpoint of the binding strength and energy density being in a trade-off relation with each other.

As a negative electrode current collector, aluminum, nickel, stainless steel, chromium, copper, silver, and alloys thereof are preferred in terms of electrochemical stability. With respect the shape, a foil, flat plate, mesh-like member may be exemplified.

<2-3. Positive Electrode>

A positive electrode has a positive electrode current collector made of a metal foil, and a positive electrode active material applied to one surface or both surfaces of the positive electrode current collector. Positive electrode active material is bound on the positive electrode current collector by a binder for a positive electrode so as to cover the positive electrode current collector. Positive electrode current collector is arranged to have an extending portion connected to a positive electrode terminal, and the positive electrode active material is not applied to the extending portion.

The positive electrode active material is not particularly limited to as long as it is capable of storing and releasing lithium. Positive electrode active material may be selected in terms of several viewpoints. From a viewpoint of high energy density, it is preferable to include a compound having a high capacity. The compound having a high capacity may be lithium nickelate ($LiNiO_2$) or lithium nickel composite oxide obtained by substituting a part of Ni of lithium nickelate with another metal element and the like, and the layered lithium nickel composite oxides represented by the following formula (A) are preferred.

$$Li_yNi_{(1-x)}M_xO_2 \qquad (A)$$

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

Further, it is also possible to use radical materials as the positive electrode active material.

As the positive electrode binder, the same material as the negative electrode binder can be used. Amount of the positive electrode binder is preferably 2 to 15 pts.mass in 100 pts.mass of positive electrode active material in terms of "sufficient binding force" and "improving energy" which are trade-off relation.

As the positive electrode current collector, for example, aluminum, nickel, stainless steel or alloys thereof may be used. As the shape thereof, foil, flat plate, mesh and the like are exemplified. Aluminum foil may be preferably used as the positive electrode current collector.

For the purpose of reducing an impedance, a supplemental conductive material may be added within a coat layer of the positive electrode active material. As the supplemental conductive material, a carbonaceous particles such as graphite, carbon black, and acetylene black are exemplified.

<Electrolyte Solution>

As an electrolyte solution used in the present embodiment, non-aqueous electrolyte solutions containing a lithium salt (supporting salt), and a non-aqueous solvent for dissolving the support salt are used.

As the non-aqueous solvents, aprotic organic solvents such as carbonic acid esters (open chain or cyclic carbonates), carboxylic acid esters (open chain or cyclic carboxylic acid esters), phosphoric acid esters and the like may be used.

Examples of the carbonic acid ester solvents include, cyclic carbonates such as propylene carbonate (PC), ethylene carbonate (EC), butylene carbonate (BC) and vinylene carbonate (VC); open chain carbonates such as dimethyl carbonate (DMC), diethyl carbonate (DEC), ethyl methyl carbonate (EMC) and dipropyl carbonate (DPC); and propylene carbonate derivatives.

Among these, carbonic acid esters (cyclic or linear carbonate), such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC), are preferred.

Examples of the phosphoric acid esters include, for example, trimethyl phosphate, triethyl phosphate, tripropyl phosphate, trioctyl phosphate, triphenyl phosphate, and the like.

Examples of solvents that can be contained in the non-aqueous electrolyte solution include, in addition to those mentioned above, for example, ethylene sulfite (ES), propane sultone (PS), butane sultone (BS), dioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-dioxahexanedionate, dimethyl 2,5-dioxahexanedionate, furan, 2,5-dimethylfuran, diphenyl sulfide (DPS), dimethoxyethane (DME), dimethoxymethane (DMM), diethoxy ethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoromethyl acetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonates electrolyte, glyme, ether, acetonitrile, propionitrile, γ-butyrolactone, γ-valerolactone, dimethyl sulfoxide (DMSO), ionic liquids, phosphazene, aliphatic carboxylic acid esters such as methyl formate, methyl acetate, and ethyl propionate, or compounds in which a part of hydrogen atoms of these compounds is/are substituted with fluorine atom(s).

As the supporting salt in the present embodiment, lithium salts that can be used in usual lithium ion batteries such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like can be used. Supporting salts may be used alone or in combination of two or more.

Non-aqueous solvent may be used alone, or in combination of two or more.

EXAMPLE

Although the present embodiment will be described in detail referring the example below, the present inventions are not limited thereto.

Example 1

An aramid microporous membrane was used for the substrate, with thickness of 12 μm, porosity of 70%, Gurley value of 80 seconds/100 ml. Range of pore diameter distribution was 0.1 μm to 0.5 μm.

PVA was used for the composite resin, with saponification degree of 95% or more, polymerization degree of approximately 2000. PVA aqueous solution of 0.1 wt % was prepared by dissolving PVA in pure water. After immersing the substrate for 30 seconds in the aqueous solution, it was pulled out, then excess aqueous solution was removed and the membrane was dried at normal temperature.

After drying it for 10 minutes at 150° C., separator was prepared. The separator has Gurley value of 100 seconds/100 ml and the ratio of composite resin in the separator was 0.5 wt %. Average thickness per one sheet was calculated by measuring the thickness of five stacked separators with a micrometer. It was found that there was no difference relative to the substrate.

The following battery was made by using the prepared separator.

(Positive Electrode)

After preparing slurry by dispersing lithium nickelate, a conductive carbon material, and polyvinylidene fluoride as a binder at the weight ratio of 92:4:4 in N-methyl-2-pyrrolidone, the slurry was applied on the aluminum current collector foil and dried to form positive active material layer. Similarly, active material layer was formed on the other side of the aluminum current collector foil, and then it was rolled to obtain a positive electrode plate.

(Negative Electrode)

After preparing slurry by dispersing natural graphite, sodium carboxymethyl cellulose as a thickener, a styrene-butadiene rubber as a binder, at the weight ratio of 98:1:1 in an aqueous solution, the slurry was applied on the copper current collector foil and dried to form negative active material layer. Similarly, active material layer was formed on the other side of copper current collector foil, and then it was rolled to obtain a negative electrode plate.
(Electrolyte)

As the non-aqueous solvent of the electrolytic solution, non-aqueous solvent of EC and DEC mixed at a volume ratio of 30:70. As a supporting salt, $LiPF_6$ was dissolved so that concentration becomes 1 M.
(Manufacturing Battery)

Positive electrode palates were cut into 50 mm×52 mm as a size without a current output portion and negative electrode plates were cut into 52 mm×54 mm as a size without a current output portion. The electrode plates were stacked via separators so that battery capacity becomes approximately 400 mAh. After connecting current output terminals to the stacked positive electrode plate and negative electrode plate respectively, it was accommodated in the laminated film package of aluminum and resin. After injecting electrolyte solution into the package, the package was sealed under the decompressed condition to obtain a battery
(Evaluation of Battery)

After conducting initial changing/discharging and aging of the obtained battery, the battery was charged up to 4.2 V battery voltage at minus 20° C. under the constant voltage and constant current mode. Charging current was 2 ItA. By this charging, battery voltage rose to 4.2 V, no declining of battery voltage during and after charging was observed. Property of the separator and charging result are shown in a table.

Example 2

Separator was prepared in the same manner as example 1, except that concentration of the PVA aqueous solution was 1 wt %. Charging property was evaluated after preparing the battery in the same manner as example 1. Similar to example 1, battery voltage rose to 4.2 V and no declining of battery voltage during and after charging was observed. Property of the separator and charging result are shown in the table.

Example 3

Separator was prepared in the same manner as example 1, except that concentration of the PVA aqueous solution was 2 wt %. Charging property was evaluated after preparing a battery in the same manner as example 1. Similar to example 1, battery voltage rose to 4.2 V and no declining of battery voltage during and after charging was observed. Property of the separator and charging result are shown in the table.

Example 4

The same substrate as example 1 was used and CMC was used as composite resin. CMC aqueous solution of 0.01 wt % was prepared by dissolving it in pure water. After immersing the substrate in the aqueous solution for 30 seconds, it was pulled out, then excess aqueous solution was removed and the substrate was dried at normal temperature. Next, it was dried at 90° C. for 30 minutes to obtain the separator.

| | Substrate | Composite resin | Coat surface | Solvent | Resin concentration in solution (w %) | Composite resin amount (w %) | Thickness increase/one side (μm) | Gurley (sec/100 ml) | charging resutl |
|---|---|---|---|---|---|---|---|---|---|
| Example1 | aramid porous membrane | PVA | double side | pure water | 0.1 | 0.5 | 0 | 100 | o |
| Example2 | | | double side | | 1 | 5 | 0 | 140 | o |
| Example3 | | | double side | | 2 | 10 | 0.4 | 300 | o |
| Example4 | | CMC | double side | pure water | 0.01 | 1 | 0 | 105 | o |
| Example5 | | | double side | | 0.1 | 10 | 0.4 | 240 | o |
| Example6 | | PAA | double side | ethanol 30 vol % aqueous solution | 0.05 | 0.5 | 0 | 100 | o |
| Example7 | | | double side | | 0.1 | 2 | 0 | 120 | o |
| Example8 | | | double side | | 0.2 | 10 | 0 | 280 | o |
| Example9 | | SBR | double side | pure water | 1 | 3 | 0 | 150 | o |
| Example10 | | PVA | one side | pure water | 1 | 2.5 | 0 | 110 | o |
| Example11 | | CMC | one side | pure water | 0.1 | 5 | 0.2 | 160 | o |
| Example12 | | PAA | one side | ethanol 30 vol % aqueous solution | 0.1 | 1 | 0 | 100 | o |
| Example13 | polyimide porous membrane | PAA | double side | ethanol 30 vol % aqueous solution | 0.05 | 0.5 | 0 | 105 | o |
| Example14 | | | double side | | 0.2 | 10 | 0 | 290 | o |
| Example15 | PPS non-woven fabric | CMC | double side | pure water | 1 | 8 | 1 | 200 | o |
| comparative example 1 | aramid porous membrane | None | double side | — | — | — | — | 80 | x |
| comparative example 2 | | PVA | double side | pure water | 0.05 | 0.2 | 0 | 85 | x |
| comparative example 3 | | | double side | | 3 | 15 | 2 | 500 or more | x |
| comparative example 4 | | CMC | double side | pure water | 0.005 | 0.1 | 0 | 85 | x |
| comparative example 5 | | | double side | | 0.25 | 13 | 1.4 | 500 or more | x |
| comparative example 6 | | PAA | double side | ethanol 30 vol % aqueous solution | 0.01 | 0.2 | 0 | 85 | x |
| comparative example 7 | | | double side | | 0.3 | 12 | 1.4 | 500 or more | x |
| comparative example 8 | | CMC | one side | pure water | 0.01 | 0.5 | 0 | 90 | x |
| comparative example 9 | polyimide porous membrane | PAA | double side | ethanol 30 vol % aqueous solution | 0.01 | 0.2 | 0 | 90 | x |
| comparative example 10 | | | double side | | 0.3 | 12 | 1.4 | 500 or more | x |

Gurley value of the obtained separator was 105 sec/100 ml, and the thickness was not changed after composition of resin, and ratio of composite resin in the separator was 1 wt %. Charging property was evaluated after preparing a battery in the same manner as example 1. Similar to example 1, battery voltage rose to 4.2 V and no declining of battery voltage during and after charging was observed. Property of the separator and charging result are shown in the table.

Example 5

Separator was prepared in the same manner as example 4, except that concentration of the CMC aqueous solution was 0.1 wt %. Charging property was evaluated after preparing a battery with this separator. Similar to example 1, battery voltage rose to 4.2 V and no declining of battery voltage during and after charging was observed. Property of the separator and charging result are shown in the table.

Example 6

The same substrate as example 1 was used and polyacrylic acid (PAA) was used as composite resin. PAA solution of 0.05 wt % was prepared by dissolving PAA in a mixed solvent of pure water 70% by volume and ethanol 30% by volume. After immersing the substrate in the aqueous solution for 30 seconds, it was pulled out, then excess aqueous solution was removed and the substrate was dried at normal temperature. Next, it was dried at 90° C. for 30 minutes to obtain the separator. Gurley value of the obtained separator was 100 sec/100 ml, and the thickness was not changed after composite of resin, and the ratio of composite resin in the separator was 0.5 wt %.

Charging property was evaluated after preparing a battery in the same manner as example 1. Similar to example 1, battery voltage rose to 4.2 V and no declining of battery voltage during and after charging was observed. Property of the separator and charging result are shown in the table.

Example 7

Separator was prepared in the same manner as example 6, except that concentration of the PAA aqueous solution was 0.1 wt %. Charging property was evaluated after preparing a battery with this separator. Similar to example 1, battery voltage rose to 4.2 V and no declining of battery voltage during and after charging was observed. Property of the separator and charging result are shown in the table.

Example 8

Separator was prepared in the same manner as example 6, except that concentration of the PAA aqueous solution was 0.2 wt %. Charging property was evaluated after preparing a battery with this separator. Similar to example 1, battery voltage rose to 4.2 V and no declining of battery voltage during and after charging was observed. Property of the separator and charging result are shown in the table.

Example 9

The same substrate as example 1 was used and SBR was used as the composite resin. For the composite of resin, dispersion liquid in which SBR fine particles with particle diameter of 50 nm to 100 nm were dispersed, diluted with pure water, was used. Amount of SBR fine particles in the diluted dispersion liquid was 1 wt %. After immersing the substrate in the SBR dispersion liquid for 30 seconds, it was pulled out, then excess aqueous solution was removed and the substrate was dried at normal temperature. Gurley value of the obtained separator was 150 sec/100 ml, and the thickness was not changed after composite of resin, and ratio of composite resin in the separator was 3 wt %.

Charging property was evaluated after preparing a battery in the same manner as example 1. Similar to example 1, battery voltage rose to 4.2 V and no declining of battery voltage during and after charging was observed. Property of the separator and charging result are shown in the table.

Example 10

The same substrate as example 2 and PVA aqueous solution were used. After the substrate floated on the PVA aqueous solution in the container for 30 seconds such that only one side of the substrate touched to the PVA aqueous solution, it was pulled out, PVA aqueous solution was supplied only with the one side of the substrate. Since the substrate floated on PVA aqueous solution, the substrate surface that touched to the PVA aqueous solution was wet with PVA aqueous solution. However, it was found that aqueous solution did not penetrated the substrate towards the opposite side.

After excess aqueous solution was removed, it was dried at normal temperature. Next, it was dried at 150° C. for 10 minutes to obtain separator. Charging property was evaluated after preparing a battery in the same manner as example 1. PVA composited surface of the separator faced to negative electrode. Similar to example 1, battery voltage rose to 4.2 V and no declining of battery voltage during and after charging was observed. Property of the separator and charging result are shown in a table.

Example 11

The same substrate and CMC aqueous solution as example 5 were used, and the CMC aqueous solution was supplied with only one surface of the substrate in the same manner as example 9. After removing excess aqueous solution, the substrate was dried at normal temperature. Next, it was dried at 90° C. for 30 minutes to obtain the separator. Charging property was evaluated after preparing the battery using this separator in the same manner as example 1. CMC composite surface of the separator faced to negative electrode. Similar to example 1, battery voltage rose to 4.2 V and no declining of battery voltage during and after charging was observed. Property of the separator and charging result are shown in the table.

Example 12

The same substrate and PAA solution as example 7 were used, and the PAA solution was supplied with only one surface of the substrate in the same manner as example 9. After removing excess aqueous solution, the substrate was dried at normal temperature. Next, it was dried at 90° C. for 30 minutes to obtain the separator. Charging property was evaluated after preparing the battery using this separator in the same manner as example 1. PAA composited surface of the separator faced to negative electrode. Similar to example 1, battery voltage rose to 4.2 V and no declining of battery voltage during and after charging was observed. Property of the separator and charging result are shown in the table.

Example 13

Polyimide fine porous membrane with thickness of 17 μm, porosity of 75%, Gurley value of 75 seconds/100 ml was used as a substrate. Range of pore diameter distribution was 0.1 µm to 0.5 µm. PAA was used as a composite resin. PAA solution of 0.05 wt % was prepared by dissolving PAA in a mixed solvent of pure water 70% by volume and ethanol 30% by volume. After immersing the substrate in the aqueous solution for 30 seconds, it was pulled out, then excess aqueous solution was removed and the substrate was dried at normal temperature. Next, it was dried at 90° C. for 30 minutes to obtain the separator. Gurley value of the obtained separator was 105 sec/100 ml, and the thickness was not changed after composite of resin, and ratio of composite resin in the separator was 0.5 wt %.

Similar to example 1, battery voltage rose to 4.2 V and no declining of battery voltage during and after charging was observed. Property of the separator and charging result are shown in the table.

Example 14

Separator was prepared and battery property was evaluated in the same manner as example 12, except that concentration of the PAA aqueous solution was 0.2 wt %. Similar to example 1, battery voltage rose to 4.2 V and no declining of battery voltage during and after charging was observed. Property of the separator and charging result are shown in the table.

Example 15

PPS non-woven fabric with thickness of 20 µm, porosity of 55%, Gurley value of 5 seconds/100 ml was used as a substrate. CMC was used as a composite resin. CMC aqueous solution of 1 wt % was prepared by dissolving CMC in pure water. The CMC aqueous solution was delivered by drops onto the PPS non-woven fabric substrate hold horizontally, then the solution was hold for one minute and penetration to the other side of the PPS non-woven fabric was not found. After immersing the PPS non-woven substrate in the aqueous solution for 30 seconds, it was pulled out, then excess aqueous solution was removed and the substrate was dried at normal temperature. Next, it was dried at 90° C. for 30 minutes to obtain the separator. Gurley value of the obtained separator was 200 sec/100 ml. Thickness was increased by 1 µm per one side due to composite of resin. Ratio of composite resin in the separator was 8 wt %.

Similar to example 1, battery voltage rose to 4.2 V and no declining of battery voltage during and after charging was observed. Property of the separator and charging result are shown in the table.

Comparative Example 1

The Substrate of aramid porous membrane without composite of resin was used as a separator. Battery was prepared in the same matter as example 1, and it was charged up to 4.2 V battery voltage at minus 20° C. under constant voltage and constant current mode, similarly to example 1. Charging current was 2 ItA similar to example 1. After the battery voltage increased to approximately 4.0 V, increase of battery voltage stopped, then battery voltage started to decrease despite supplying charging current.

Comparative Example 2

The separator was prepared in the same manner as example 1, except that concentration of the PVA aqueous solution was 0.05 wt %. Battery was prepared using this separator in the same manner as example 1 and charging property was evaluated. Similar to comparative example 1, after battery voltage increased to approximately 4.0V, increase of battery voltage stopped, then battery voltage started to decrease despite supplying charging current. Property of the separator and charging result are shown in the table.

Comparative Example 3

The separator was prepared in the same manner as example 1, except that concentration of the PVA aqueous solution was 3 wt %. Battery was prepared using this separator in the same manner as example 1 and charging property was evaluated. After the charging started, battery voltage increased rapidly and reached to 4.2 V while the charge amount did not reach to 10% of the required amount. After the charging was stopped, the battery voltage decreases significantly. Property of the separator and charging result are shown in the table.

Comparative Example 4

The separator was prepared in the same manner as example 4 except that concentration of the CMC aqueous solution was 0.005 wt %, and battery was prepared using this separator in the same manner as example 1 and charging property was evaluated. Similar to comparative example 1, after battery voltage increased to approximately 4.0 V, increase of battery voltage stopped, then battery voltage started to decrease despite supplying charging current. Property of the separator and charging result are shown in the table.

Comparative Example 5

The separator was prepared in the same manner as example 4 except that concentration of the CMC aqueous solution was 0.25 wt %, and battery was prepared using this separator in the same manner as example 1 and charging property was evaluated. After the charging started, battery voltage increased rapidly and reached to 4.2 V while the charge amount did not reach to 10% of the required amount. After the charging was stopped, battery voltage decreases significantly. Property of the separator and charging result are shown in the table.

Comparative Example 6

The separator was prepared in the same manner as example 6 except that concentration of the PAA solution was 0.01 wt %, and battery was prepared using this separator in the same manner as example 1 and charging property was evaluated. Similar to comparative example 1, after battery voltage increased to approximately 4.0 V, increase of the battery voltage stopped, then battery voltage started to decrease despite supplying charging current. Property of the separator and charging result are shown in the table.

Comparative Example 7

The separator was prepared in the same manner as example 6 except that concentration of the PAA solution was 0.3 wt %, and battery was prepared using this separator in the same manner as example 1 and charging property was evaluated. After the charging started, battery voltage increased rapidly and reached to 4.2 V while the charge amount did not reach to 10% of the required amount. After the charging was stopped, battery voltage decreases significantly. Property of the separator and charging result are shown in the table.

Comparative Example 8

The separator was prepared in the same manner as example 10 except that concentration of the CMC aqueous solution was 0.01 wt %, and battery was prepared using this separator in the same manner as example 1 and charging property was evaluated. CMC composited surface of the separator faced to negative electrode. Similar to comparative example 1, after battery voltage increased to approximately 4.0 V, increase of battery voltage stopped, then battery voltage started to decrease despite supplying charging current. Property of the separator and charging result are shown in the table.

Comparative Example 9

The separator was prepared in the same manner as example 12 except that concentration of the PAA aqueous solution was 0.01 wt %, and battery was prepared using this separator in the same manner as example 1 and charging property was evaluated. Similar to comparative example 1, after battery voltage increased to approximately 4.0 V, increase of battery voltage stopped, then battery voltage started to decrease despite supplying charging current. Property of the separator and charging result are shown in the table.

Comparative Example 10

The separator was prepared in the same manner as example 12 except that concentration of the PAA solution was 0.3 wt %, and battery was prepared using this separator in the same manner as example 1 and charging property was evaluated. As the charging started, battery voltage increased rapidly and reached to 4.2 V while the charge amount did not reach to 10% of the required amount. After the charging was stopped, battery voltage decrease significantly. Property of the separator and charging result are shown in the table.

(Supplementary Note)

The present application discloses the following inventions (characters in brackets do not intentionally limit the present invention):

1-1. A separator for secondary battery, comprising:
a1: a porous substrate (45) having a melting temperature or a decomposition temperature of 200° C. or more; and
b1: a resin member (48) formed at least inside of the substrate (45) in a plane section that occupies at least a part of a plane along with a thickness direction of the substrate; wherein said resin member is coated on inner surfaces of pores without completely blocking connecting paths that connects pores (45a) of the porous member, and wherein a distribution density of the resin member becomes lower toward inside of the substrate.

The meaning of "a distribution density of the resin member becomes lower toward inside of the substrate" means that, within a plane along with a thickness direction of the substrate, if a position is near the substrate surface (if another resin layer exist on the substrate surface as mentioned below, outermost part of the resin member), a ratio of sectional area of resin member in the pores relative to a sectional area of pores encompassed by the substrate. With respect to pores that open to the surface of the substrate, the total area of region encompassed by a profile line of the substrate of inner side of the substrate surface and an extrapolation straight line of substrate surface. It is noted that "a plane along with a thickness direction of the substrate" means a sectional plane perpendicular to the surface of the substrate or a sectional plane crossing the same.

1-2. A separator for secondary battery, comprising:
a porous substrate having a melting temperature or a decomposition temperature of 200° C. or more; and
a resin member formed at least inside of the substrate in a plane section that occupies at least a part of a plane along with a thickness direction of the substrate; wherein said resin member is coated on inner surfaces of pores without completely blocking connecting paths that connects pores of the porous member, and wherein a distribution density of the resin member becomes lower toward inside of the substrate.

2. The separator for secondary battery of the above 1, wherein the resin member is further coated on a surface of the substrate to form a surface resin layer (46).

3. The separator for secondary battery of the above 2, wherein a thickness of the resin member in the surface resin layer is 1 μm or less.

4. The separator for secondary battery of the above 2 or 3, wherein a ratio between an area of an region A on a substrate surface excluding openings and an area B of the resin member existing on region on a substrate surface excluding openings is 90% or less.

5. The separator for secondary battery of according to any one of the above 1 to 4, wherein the substrate includes in its inside a region with no resin member.

6. The separator for secondary battery according to any one of the above 1 to 5, wherein the resin member is 10 wt % or less of the entire separator.

7. The separator for secondary battery according to any one of the above 1 to 6, wherein a porosity of the entire separator is 55% or more and 80% or less.

8. The separator for secondary battery according to any one of the above 1 to 7, wherein a Gurley value of the entire separator is 100 seconds or more and 300 seconds or less.

9. A separator for secondary battery, comprising:
a2: a substrate of a woven fabric or a non-woven fabric having a melting temperature or a decomposition temperature of 200° C. or more; and
b2: a resin member formed at least inside of the substrate in a plane section that occupies at least a part of a plane along with a thickness direction of the substrate; wherein said resin member is coated on inner surfaces of spaces in the substrate without completely blocking the spaces, and wherein a distribution density of the resin member becomes lower toward inside of the substrate.

The meaning of "a distribution density of the resin member becomes lower toward inside of the substrate" means that, within a plane along with a thickness direction of the substrate, if a position is near the substrate surface (if another resin layer exist on the substrate surface as mentioned below, outermost part of the resin member), a ratio of sectional area of resin member in the pores relative to a sectional area of pores encompassed by the substrate. It is noted that technical matters of the above 2.-8. are combinable to the invention of the above 9.

10. A secondary battery (50), comprising:
the battery element (20) having a separator for secondary battery according to any one of the above 1 to 9, a positive electrode and a negative electrode; and
an outer package (10) for packaging the battery element together with an electrolyte.

REFERENCE NUMERAL LIST

10 OUTER PACKAGE
11, 12 FILM
20 BATTERY ELEMENT
21, 25 ELECTRODE TAB
41 SEPARATOR
45 SUBSTRATE
45a PORE
46 RESIN LAYER (OUTER SIDE OF SUBSTRATE)
47 RESIN COAT PORTION (INNER SIDE OF SUBSTRATE)
48 RESIN
48a PATH
50 FILM PACKAGED BATTERY

The invention claimed is:

1. A separator for secondary battery, comprising:
a porous substrate having a melting temperature of 200° C. or more or a decomposition temperature of 200° C. or more, wherein the substrate is aromatic polyamide or polyimide; and
a resin member formed at least inside of the substrate in a plane section that occupies at least a part of a plane along with a thickness direction of the substrate, the resin member being formed by feeding resin in solvent to a surface of the substrate and drying it, wherein the resin is a water-soluble resin or a water-dispersible resin and the solvent contains pure water;
wherein said resin member is coated on inner surfaces of pores of the porous substrate without completely blocking connecting paths that connect the pores, wherein a distribution density of the resin member becomes lower toward the inside of the substrate, and wherein the resin member is formed on an area that covers more than 0% and 90% or less of a surface of the substrate.

2. The separator for secondary battery according to claim 1, wherein the substrate includes in its inside a region with no resin member.

3. The separator for secondary battery according to claim 1, wherein the resin member is 10 wt % or less of the entire separator.

4. The separator for secondary battery according to claim 1, wherein a porosity of the entire separator is 55% or more and 80% or less.

5. The separator for secondary battery according to claim 1, wherein a Gurley value of the entire separator is 100 seconds or more and 300 seconds or less.

6. The separator for secondary battery according to claim 1, wherein the resin is any one of polyvinyl alcohol (PVA), sodium carboxymethyl cellulose (Na-CMC), polyacrylic acid (PAA), and styrene-butadiene rubber (SBR).

7. The separator for secondary battery of claim 1, wherein the resin member is further coated on the surface of the substrate to form a surface resin layer.

8. The separator for secondary battery of claim 7, wherein a thickness of the resin member in the surface resin layer is 1 μm or less.

9. The separator for secondary battery of claim 7, wherein a ratio between an area of the surface of the substrate excluding openings and an area of the resin member on the surface of the substrate is 90% or less.

10. A secondary battery, comprising:
the separator for secondary battery according to claim 1;
a battery element having a positive electrode and a negative electrode; and an outer package for packaging the battery element together with an electrolyte.

11. A separator for secondary battery, comprising:
a substrate of a woven fabric having a melting temperature of 200° C. or more or a decomposition temperature of 200° C. or more or a substrate of a non-woven fabric having a melting temperature of 200° C. or more or a decomposition temperature of 200° C. or more, wherein the substrate is polyphenylene sulfide (PPS); and
a resin member formed at least inside of the substrate in a plane section that occupies at least a part of a plane along with a thickness direction of the substrate, the resin member being formed by feeding resin in solvent to a surface of the substrate and drying it, wherein the resin is a water-soluble resin or a water-dispersible resin and the solvent contains pure water;
wherein said resin member is coated on inner surfaces of spaces in the substrate without completely blocking the spaces, wherein a distribution density of the resin member becomes lower toward the inside of the substrate, and wherein the resin member is formed on an area that covers more than 0% and 90% or less of a surface of the substrate.

* * * * *